(12) United States Patent
Wu et al.

(10) Patent No.: US 9,185,402 B2
(45) Date of Patent: Nov. 10, 2015

(54) TRAFFIC CAMERA CALIBRATION UPDATE UTILIZING SCENE ANALYSIS

(71) Applicant: Xerox Corporation, Norwalk, CT (US)

(72) Inventors: Wencheng Wu, Webster, NY (US); Edul N. Dalal, Webster, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 334 days.

(21) Appl. No.: 13/868,267

(22) Filed: Apr. 23, 2013

(65) Prior Publication Data

US 2014/0313347 A1 Oct. 23, 2014

(51) Int. Cl.
*H04N 17/00* (2006.01)
*H04N 17/02* (2006.01)
*G06T 7/00* (2006.01)

(52) U.S. Cl.
CPC ............ *H04N 17/002* (2013.01); *G06T 7/0018* (2013.01); *G06T 2207/10016* (2013.01); *G06T 2207/20076* (2013.01); *G06T 2207/30232* (2013.01); *G06T 2207/30236* (2013.01)

(58) Field of Classification Search
CPC ................. H04N 17/02; G06T 7/0018; G06T 2207/10016; G06T 2207/20076; G06T 2207/30232; G06T 2207/30236
USPC ................................................. 348/148, 149
See application file for complete search history.

(56) References Cited

U.S. PATENT DOCUMENTS

| | | | |
|---|---|---|---|
| 7,068,302 B2 | 6/2006 | Ebenstein et al. | |
| 8,150,143 B2 | 4/2012 | Chen et al. | |
| 8,379,926 B2 | 2/2013 | Kanhere et al. | |
| 2007/0008176 A1 | 1/2007 | Sirota et al. | |
| 2008/0166023 A1* | 7/2008 | Wang | 382/107 |
| 2009/0046897 A1* | 2/2009 | Rowsell et al. | 382/107 |
| 2009/0174773 A1 | 7/2009 | Gowdy et al. | |
| 2009/0207046 A1 | 8/2009 | Arrighetti | |
| 2010/0066828 A1 | 3/2010 | Disaro et al. | |
| 2010/0245568 A1 | 9/2010 | Wike, Jr. et al. | |
| 2010/0283856 A1 | 11/2010 | Kahler et al. | |
| 2011/0115912 A1 | 5/2011 | Kuehnle | |
| 2011/0273566 A1 | 11/2011 | Lock | |

(Continued)

OTHER PUBLICATIONS

Bay, H. et al., "Speeded-Up Robust Features (SURF)," Computer Vision and Image Understanding (2008) 110(3):346-359.

(Continued)

*Primary Examiner* — Michael Lee
(74) *Attorney, Agent, or Firm* — Kermit D. Lopez; Luis M. Ortiz; Ortiz & Lopez, PLLC

(57) ABSTRACT

Methods and systems are disclosed for updating camera geometric calibration utilizing scene analysis. Geometric calibration parameters can be derived with respect to one or more cameras and selected reference points of interest identified from a scene acquired by one or more of such cameras. The camera geometric calibration parameters can be applied to image coordinates of the selected reference points of interest to provide real-world coordinates at a time of initial calibration of the camera(s). A subset of a video stream from the camera(s) can then be analyzed to identify features of a current scene captured by the camera(s) that match the selected reference points of interest and provide a current update of the camera geometric calibration parameters with respect to the current scene.

20 Claims, 9 Drawing Sheets

(56) References Cited

U.S. PATENT DOCUMENTS

2013/0208121 A1* 8/2013 Wu et al. .................. 348/149
2014/0126780 A1* 5/2014 Wang ...................... 382/107

OTHER PUBLICATIONS

DetectSURFFeatures, Detect SURF features, MATLAB, http://www.mathworks.com/help/vision/ref/detectsurffeatures.html, printed Oct. 23, 2012, 2 pages.

Lowe, D. G., "Object Recognition from Local Scale-Invariant Features," Proc. of the International Conference on Computer Vision Sep. 1999, Corfu, pp. 1-8.

RANSAC—Wikipedia, the free encyclopedia, printed Oct. 8, 2012, 6 pages.

Schoepflin, T. N. et al., "Dynamic Camera Calibration of Roadside Traffic Management Cameras for Vehicle Speed Estimation," IEEE Transactions on Intelligent Transportation Systems (2003) 4(2):90-98.

* cited by examiner

TRAFFIC CAMERA CALIBRATION UPDATE UTILIZING SCENE ANALYSIS

FIELD OF THE INVENTION

Embodiments are generally related to image-processing methods and systems. Embodiments are further related to video-based surveillance methods and systems. Embodiments are also related to traffic and video cameras.

BACKGROUND

Camera geometric calibration, namely the conversion of image pixel coordinates to real-world coordinates, is a critical step for various image-based and video-based transportation applications such as speed enforcement, on-street parking, etc. The most straightforward approach is to temporarily lay out visible markers with known real-world dimensional measurements, manually take an image/video of the scene, manually identify the pixel coordinates of those markers, and then use standard camera calibration techniques to derive appropriate transformations. Such a method may be labor intensive and/or disruptive to traffic flow. Another option is to drive a test vehicle carrying targets with known dimensions through the field of view of the camera.

Regardless of how the initial camera calibration is done, over time the accuracy of the calibration will deteriorate, and eventually it will no longer be able to adequately perform the required function. Systems and methods for correcting and maintaining camera calibration are needed.

SUMMARY

Aspects of the embodiments address limitations and flaws in the prior art by employing a calibration update technique, which utilizes scene features alone, regardless of how the initial calibration is accomplished.

Camera geometric calibration, namely the conversion of image pixel coordinates to real-world coordinates, is a critical step in the implementation of image-based and video-based transportation applications such as speed measurement/enforcement, on-street unmarked parking, etc. With so many cameras currently in use, effective and efficient camera calibration with minimal interruption of regular traffic becomes a challenge.

It is therefore an aspect of the disclosed embodiments to receive a series of images, each taken at a different time, from a traffic camera positioned to image a scene including a road, path, or intersection. There are many imaged points in the scene.

It is another aspect of the embodiments to initially store an offline calibration data set for use as the calibration data set of the traffic analysis and monitoring system. Later online calibration can provide updates to or replacements for the calibration data set. A scene location analysis module can in some embodiments be utilized to produce three dimensional location data for a subset of the imaged points from the calibration data set and one or more frames of the image series.

It is yet another aspect of the embodiments to implement a reference point discovery algorithm that identifies a set of reference points from amongst the imaged points. The reference points can be discovered in terms of reference point sub-images in the image data. A reference point description can describe the reference points and is passed to a reference point identification module. The reference point identification module can locate the reference points in the image data and produce a reference point image location data that describes where in the images each of the reference point sub-images is found. The scene location analysis module can determine reference point location data describing the three dimensional location of each of the reference points.

It is yet another aspect of the embodiments that an online calibration module determines an online calibration data set from the reference point location data and the reference point image location data. In this context, "location" refers to real-world coordinates and "image location" refers to pixel coordinates. A calibration updating module can accept the online calibration data set for use as the calibration data set to thereby automatically recalibrate the system over time.

In general, methods and systems are disclosed for updating camera geometric calibration utilizing scene analysis. Geometric calibration parameters can be derived with respect to one or more cameras and selected points of interest, with known real-world coordinates, in a scene acquired by one or more of such cameras. The camera geometric calibration parameters can be applied to image coordinates of the selected reference points of interest to provide real-world coordinates at a time of initial calibration of the camera(s). A subset of a video stream from the camera(s) can then be analyzed to identify features of a current scene captured by the camera(s) that match the selected reference points of interest and provide a current update of the camera geometric calibration parameters with respect to the current scene.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

One straightforward approach for camera calibration involves temporarily laying out visible markers with known real-world dimensional measurements, taking an image/video of the scene, identifying the pixel coordinates of those markers, and then using standard camera calibration techniques to derive appropriate transformations for camera geometric calibration. Such a method may be labor intensive and/or disruptive to traffic flow. A better solution is discussed in U.S. patent application Ser. No. 13/371,068, wherein a test vehicle carrying targets with known dimensions can be driven through the field of view of the camera and then various automated processing algorithms are applied to the data acquired for deriving camera calibration. U.S. patent application Ser. No. 13/371,068 is herein incorporated by reference in its entirety and hereinafter referred to as Wu.

Regardless of how the initial camera calibration is accomplished, over time the accuracy of the camera calibration will deteriorate, and eventually it will no longer be able to adequately perform the required function. This deterioration may be gradual, or it may be sudden and may be due to causes such as accidental impact to the camera housing. Total failure (e.g., a cut cable) is easily detected by automatic means, but detection of more subtle deteriorations is more difficult, especially without manual inspection. It is thus the objective of this invention to propose a calibration update method which utilizes scene features alone, regardless how the initial calibration is done.

Note that as the following terms can be defined and used herein as follows:

Reference Points=points (e.g., one end of lamp-post or road markings) whose real-world coordinates are determined while initial calibration is known to be valid; and discovered by SIFT, SURF, etc.

Feature Points=similar points at current time (e.g., when initial calibration may no longer be valid)—and some subset of these points are selectable, which match the reference points.

Discovery=finding the reference points the first time.

Identification=finding the feature points which match the reference points.

Figure 1:
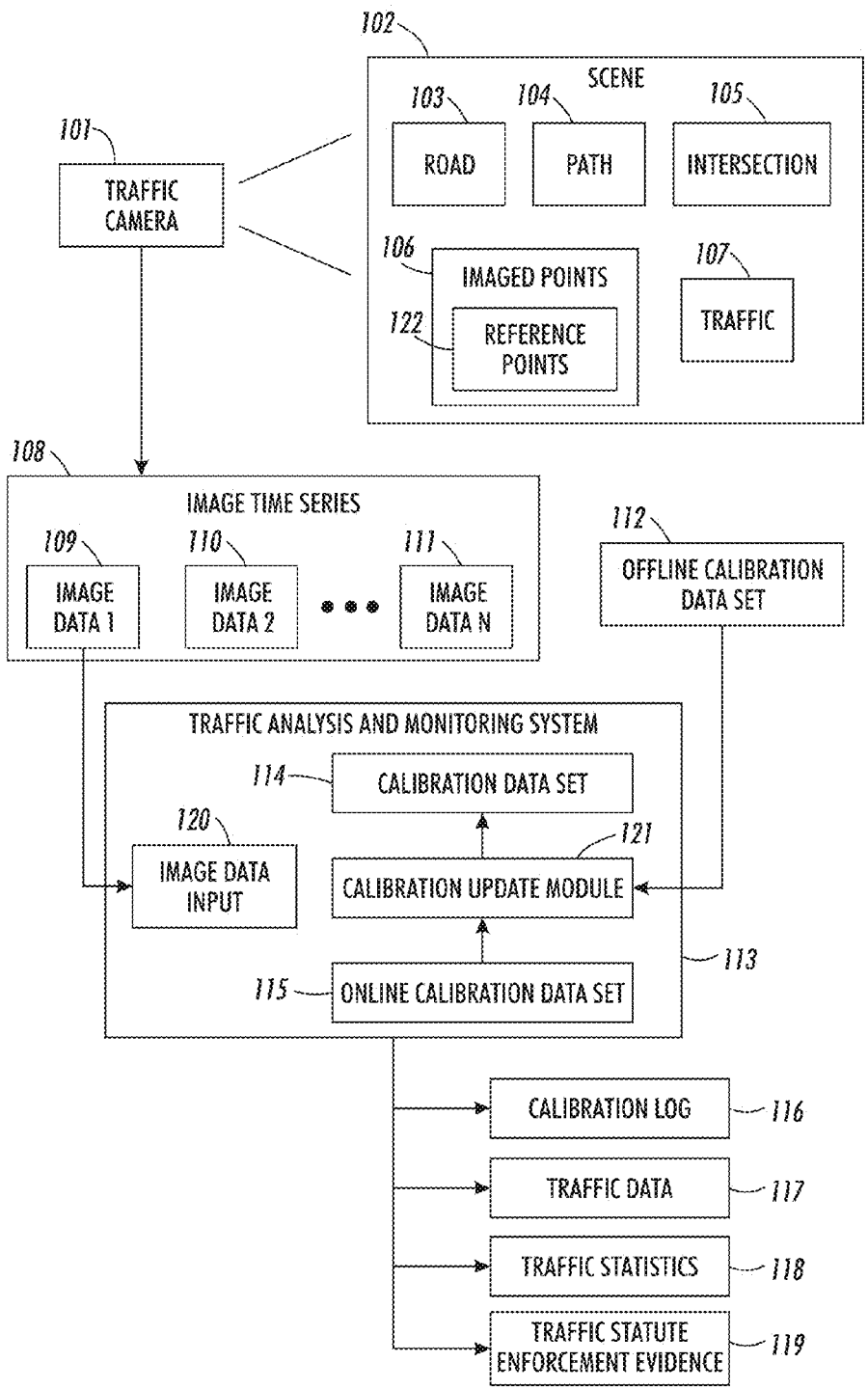
FIG. 1 illustrates a traffic camera monitoring a scene, in accordance with aspects of the embodiments.

FIG. 1 illustrates a block diagram of a system that includes a traffic camera 101 (e.g., a video camera) for monitoring a scene 102, in accordance with aspects of the disclosed embodiments. As shown in FIG. 1, the scene 102 can include, for example, a road, path, or intersection, etc., that carries traffic 107. There are numerous imaged points in the scene 102, some of which can be used as reference points 122 for calibrating the traffic camera 101. The traffic camera 101 can produce an imaged time series such as a video stream. The imaged time series 108 consists of a number of frames, or image data 109, 110, 111, each taken at a different time. The images are fed to the image data input of a traffic analysis and monitoring system 113.

The traffic analysis and monitoring system 113 can include a number of modules and data sets. Among the modules is a calibration update module 121 that can accept online calibration data 115 for use in updating a calibration data set 114. It is the calibration data set that is used for determining the real-world coordinates corresponding to individual pixels or sub-images within the imaged time series. An offline calibration data set 112 can be used as the calibration data set 114, particularly as the initial calibration.

The traffic analysis and monitoring system 113 can produce a calibration log 116, traffic data 117, traffic statistics 118, and traffic statute enforcement evidence 119. Note that the description here focuses on typical traffic information, which is relevant to the use of calibration for speed measurement/enforcement. A calibration log 116 can record the calibration data sets used during various time intervals for later use in trouble shooting and as evidence. Traffic data 117 can indicate the presence or absence of traffic as well as the speeds and direction of the vehicles. Traffic statistics 118 can indicate the numbers of vehicles passing through the scene during various time intervals, average speeds, maximum speeds, minimum speeds, a velocity histogram, aggregate directions of travel, and other information. Traffic statute enforcement evidence 119 can include video data of a vehicle breaking the law, calibration data, speed estimates, and other data that can be required for converting a machine's observations into convictions for violating traffic laws.

Figure 2:
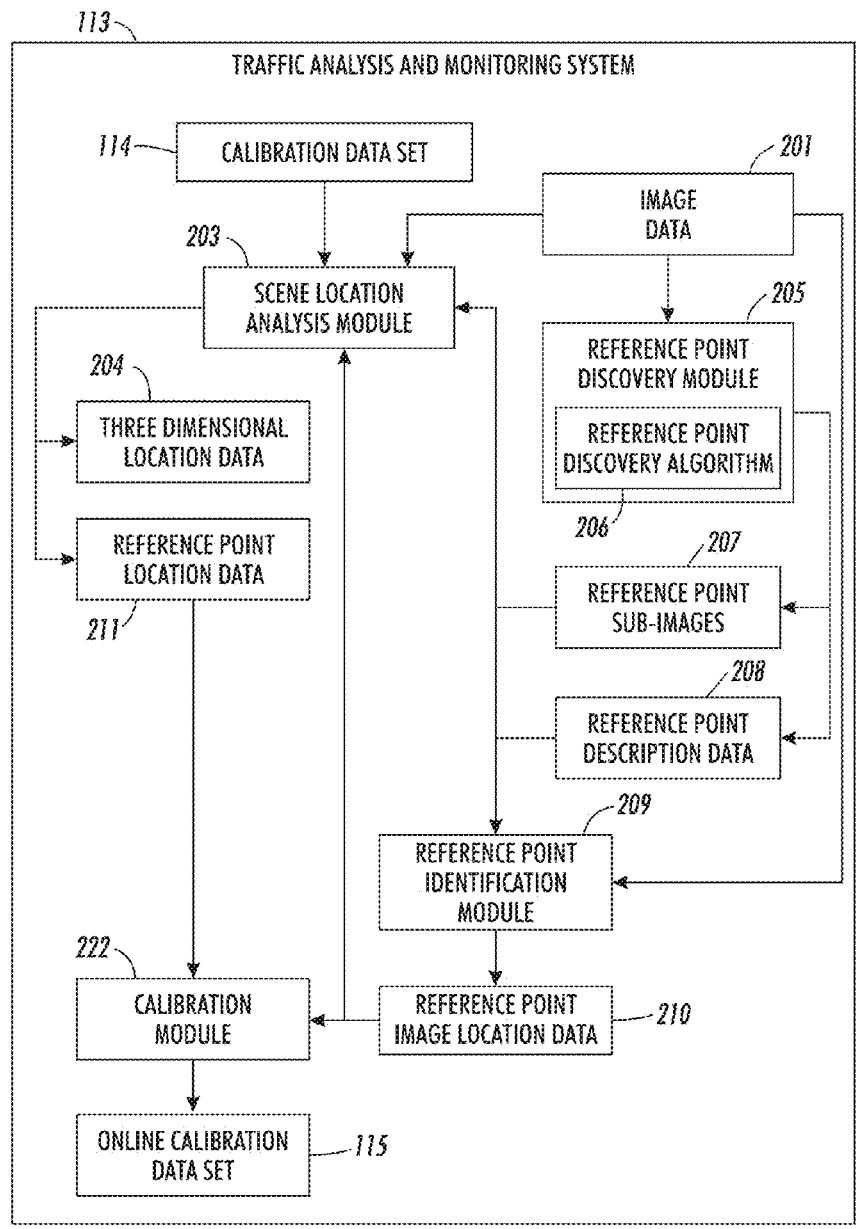
FIG. 2 illustrates a high level block diagram of a system for traffic analysis and monitoring, in accordance with aspects of the embodiments.

FIG. 2 illustrates a high-level block diagram of a system for traffic analysis and monitoring, in accordance with aspects of the embodiments. Other elements that can be included within the context of the traffic analysis and monitoring system 113 include, for example, a reference point discovery module 205, a scene location analysis module 203, a reference point image location module 209, and a calibration module 222. The reference point discovery module 205 can employ a reference point discovery algorithm 206 that analyzes image data 201 to produce or locate reference point sub-images 207 and generate reference point location data 208.

The reference point identification module 209 can employ the reference point description data 206 and/or the reference point sub-images 207 to determine reference point locations in the image data 201. The difference between the reference point discovery module 205 and the reference point identification module 209 is that the former discovers new reference points while the latter searches images for previously discovered reference points to produce reference point image location data 210.

The scene location analysis module 203 is primarily concerned with determining the three dimensional or real-world locations of things appearing in the images such as reference points. It can interact with the reference point identification module (or include similar capability) to determine where in the images the reference points are located. The scene location analysis module 203 can then use the calibration data set to determine the real-world coordinates of the imaged points. The positions of items of interest, such as car license plates, can be output as three dimensional location data 204 while the locations of the reference points can be output as reference point location data 211. Note that here the reference point location data 211 is relative to the camera position such that camera movement results in an apparent displacement of the reference points.

The calibration module 222 produces a calibration data set 115. In certain embodiments, the reference point location data 211, being the three dimensional locations of imaged reference points, and the reference point image location data 210 can be analyzed to produce the online calibration data set 115.

Figure 3:
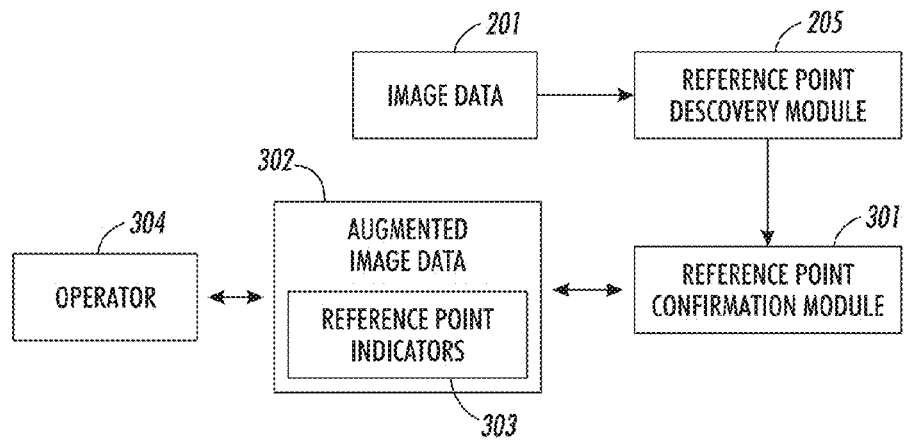
FIG. 3 illustrates an operator confirming reference points, in accordance with aspects of the embodiments.

FIG. 3 illustrates a block diagram depicting the confirmation of reference points in accordance with aspects of some embodiments of the invention. It can be appreciated that the operations shown in FIG. 3 may be automated or in some instances operator intervention may be involved. In a preferred embodiment, however, most if not all of the various modules and/or logical operations shown in FIG. 3 are automated. As indicated in FIG. 3, image data 201 can be analyzed by the reference point discovery module 205 and a set of candidate reference points are passed to a reference point confirmation module 301.

The reference point confirmation module 301 can cause augmented image data 302 to be displayed to an operator 304.

The augmented image data 302 can contain reference point indicators 303 overlaid on the image data 201 to thereby mark the reference points for the operator 304. The operator 304 observes the augmented image data 302 and can confirm or disapprove reference points. For example, the system can interpret non-permanent items, such as vehicles temporarily stopped on the roadway, as reference points. An operator can remove such reference points.

Figure 4:
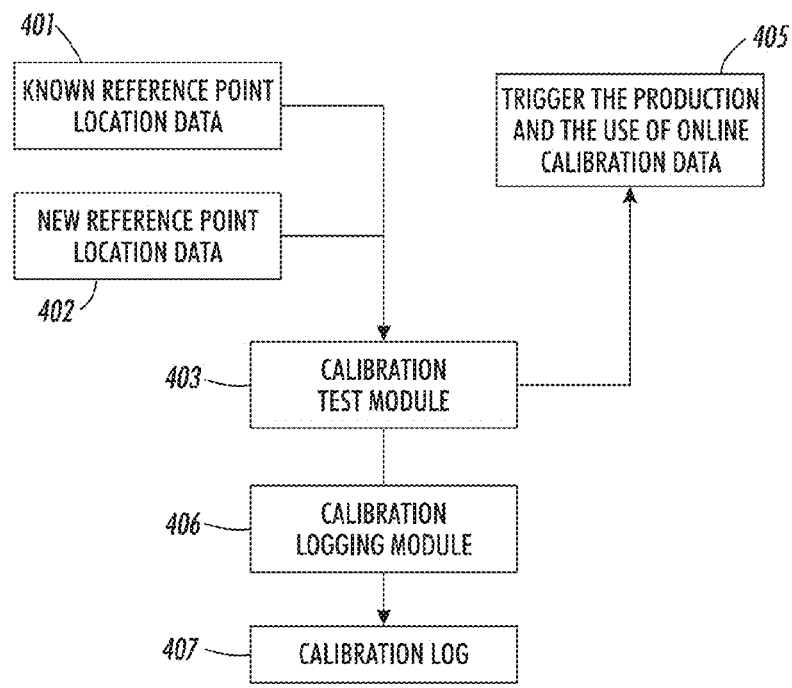
FIG. 4 illustrates certain calibration data administrative activities, in accordance with aspects of the embodiments.

FIG. 4 illustrates certain calibration data administrative activities in accordance with aspects of the embodiments. Known reference point location data 401 are previously calculated or uploaded data indicating the three dimensional locations of known reference points. The system, at a later time, can calculate those positions anew to produce new reference point location data 402. The calibration test module 403 determines the differences in locations and, if the differences are large enough, can trigger recalibration activity. For example, the camera may have moved enough that the new locations are shifted from old locations by more than a threshold amount.

Due to noise, the shift in reference point location may vary with the reference point. Consequently, some statistical measure (e.g., mean, or median, or $95^{th}$ percentile) of a plurality of reference point locations can be used. The calibration test module 403 can then cause an online calibration cycle to execute the instructions/operations shown in block 405 in which a new calibration is produced and loaded. A calibration logging module 406 can maintain a calibration log 407 indicating when the system is recalibrated. The calibration log 407 can also contain the new and old calibration values.

Figure 5:
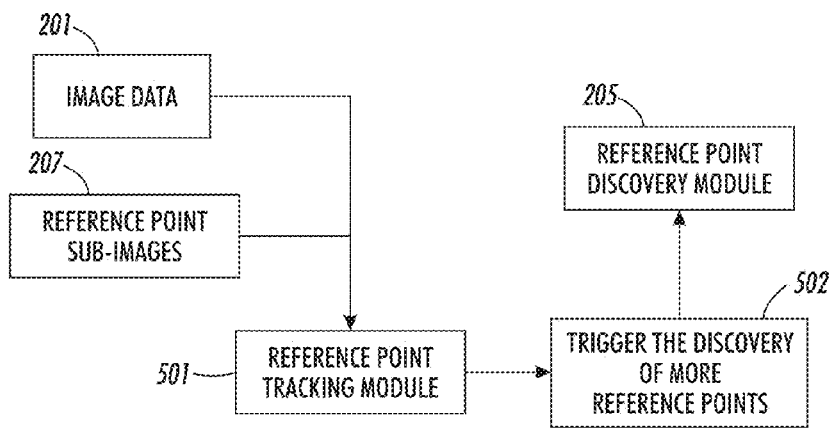
FIG. 5 illustrates reference point administration, in accordance with aspects of the embodiments.

FIG. 5 illustrates reference point administration, in accordance with an example embodiment. It should be noted that all the reference points are not necessarily visible in the scene at all times. A traffic analysis and monitoring system uses a set of reference points when initially brought into service. Some reference points can disappear for extended periods of time due to roadway construction, roadway maintenance, or other causes, or for short periods of time such as momentary occlusion by a vehicle passing through the scene. Similar activities can also create new, perhaps better, reference points within an imaged scene. A reference tracking module 501 can track the presence, absence, and perhaps quality of the reference points. The reference point tracking module can accept an image of the scene 201 and reference point sub-images 207 and attempt to find the reference points in the image. If one or more reference points are not found, the reference point tracking module 501 can send a trigger for the discovery of more reference points 502 to the reference point discovery module 205. Because the reference point tracking module 501 shares many capabilities with the reference point identification module 209, it can also use the same or similar inputs to accomplish its task.

Figure 6:
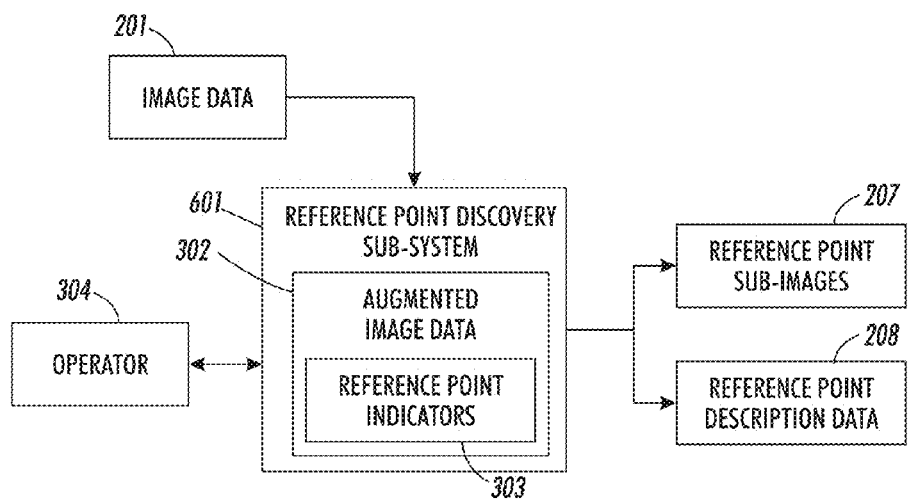
FIG. 6 illustrates an operator interacting with a system for traffic analysis and monitoring, in accordance with aspects of the embodiments.

FIG. 6 illustrates an operator interacting with a system for traffic analysis and monitoring, in accordance with aspects of the embodiments. It can be appreciated that the operations shown in FIG. 6 may be automated or in some instances operator intervention may be involved. In a preferred embodiment, however, most if not all of the various modules and or logical operations shown in FIG. 6 are automated. The operations shown in FIG. 6 are similar to those shown in FIG. 3 with the difference being that FIG. 3 illustrates confirmation of reference points whereas as shown in FIG. 6, the operator 304 can interact with the reference point discovery sub-system 601 to also suggest, add, and edit reference points. For example, the operator 304 can utilize a pointing device to select reference points or to suggest a sub-image that appears to contain an adequate reference point image. Another possibility is that the operator can delete reference points or change the size and shape of sub-images. The reference point discovery subsystem 601 can output reference point sub-images 207 and reference point description data.

Figure 7:
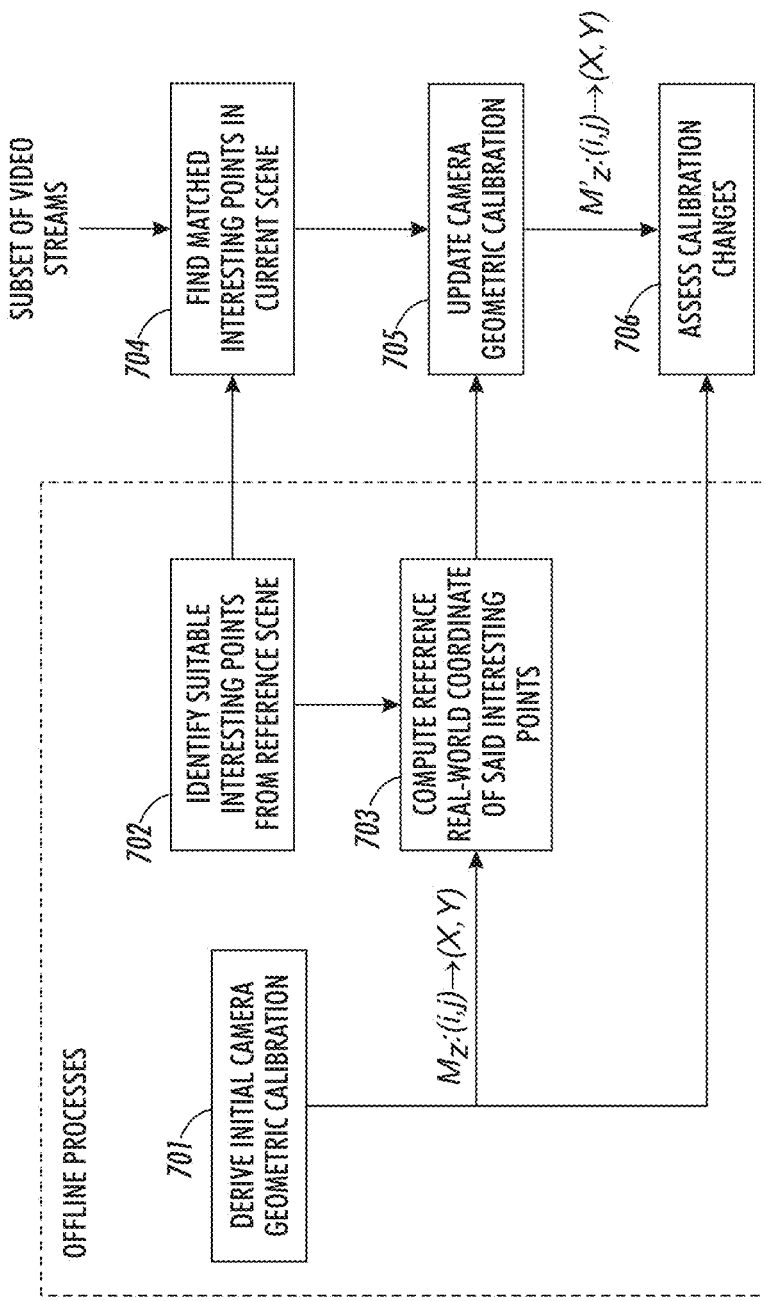
FIG. 7 illustrates a high level flow diagram for camera calibration, in accordance with aspects of the embodiments.

FIG. 7 illustrates a high level flow diagram for camera calibration in accordance with aspects of the embodiments. Traffic camera geometric calibration can be updated utilizing scene analysis. In particular, suitable reference points of interest (RPIs) identified from the scene can be monitored and analyzed over time for updating camera calibration as needed. The process can include two time scales: an offline process (less frequent) for gathering reference data and features, and an online process (more frequent) for comparing current scene features to references and updating the calibration parameters. In the offline process, initial camera geometric calibration parameters can be derived using known methods 701.

One or more images of the scene can be then acquired at or very close to the time of calibration and analyzed for the detection of suitable RPIs 702 (e.g., points on the road surface, top or bottom of fixed vertical structures such as building corners or fences). Applying the derived calibration to the image coordinates of the selected RPIs provides the corresponding real-world coordinates 703 at the time of initial camera calibration. The resulting image coordinates, real-world coordinates, and heights of the selected RPIs can be stored as reference data for future online update of calibration. This concludes the offline process. The real-world coordinates mentioned above can be in the form of XYZ relative to the camera coordinates or more conveniently in the form of XYZ relative to the road plane for many traffic applications. In the former, the XYZ are all relative to the camera, and Z is often referred to as the depth. In the latter, XY are the road plane axes, while Z is the height of the point of interest above the road plane.

In the online (e.g., run-time) process, some subset of the video stream from the traffic camera can be analyzed to find features of the current scene that match the stored RPIs 704. The selected subset of the video stream preferably contains frames with very little detected motion. The current image coordinates of all or a subset of those matched RPIs, together with their reference data, are then used to update the camera geometric calibration for the current scene 705.

Additionally and optionally, an assessment is made to measure the changes between current updated camera calibration and initial derived camera calibration 706. This assessment can be used for triggering camera maintenance or diagnostics. The benefits of the embodiments include providing for video-based systems where geometric measurement is critical, such as speed enforcement and on-street parking, to update camera geometric calibration in a timely fashion at virtually no cost.

Without loss of generality, camera geometric calibration can be described in terms of a series of projective matrices for each height Z above the road plate, denoted as $M_Z$:(i,j)→(X, Y), where $M_Z$ is uniquely defined by a 3×3 projective matrix $T_Z$ that relates image pixel coordinates (i j) to real-world coordinates (X,Y) for points on a plane at height Z by:

$$f_Z \begin{bmatrix} X \\ Y \\ 1 \end{bmatrix} = T_Z \begin{bmatrix} i \\ j \\ 1 \end{bmatrix}.$$

This is what is used in U.S. patent application Ser. No. 13/411,032 for video-based speed enforcement system. It can, however, be described in terms of intrinsic and extrinsic camera calibration matrices or other forms as well. U.S. patent application Ser. No. 13/411,032 is herein incorporated by reference in its entirety.

Figure 8:
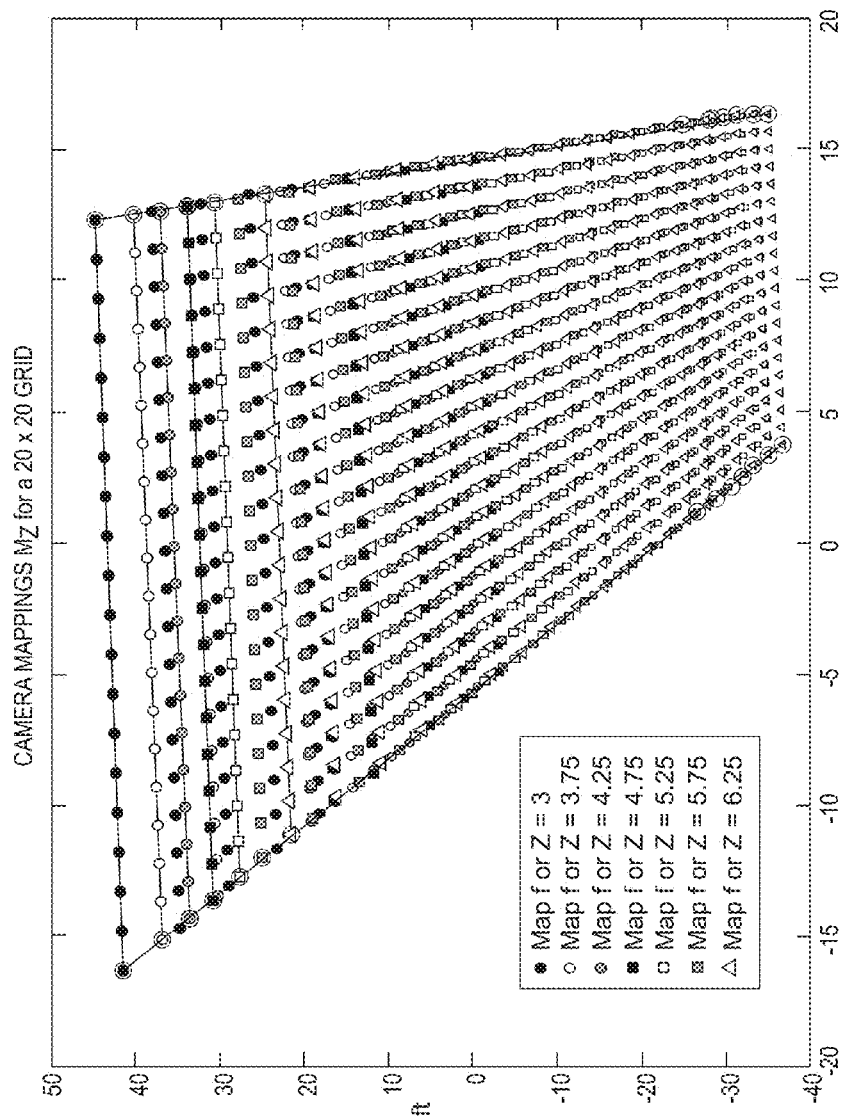
FIG. 8 illustrates an exemplary calibration yap, in accordance with aspects of the embodiments.
Figure 9:
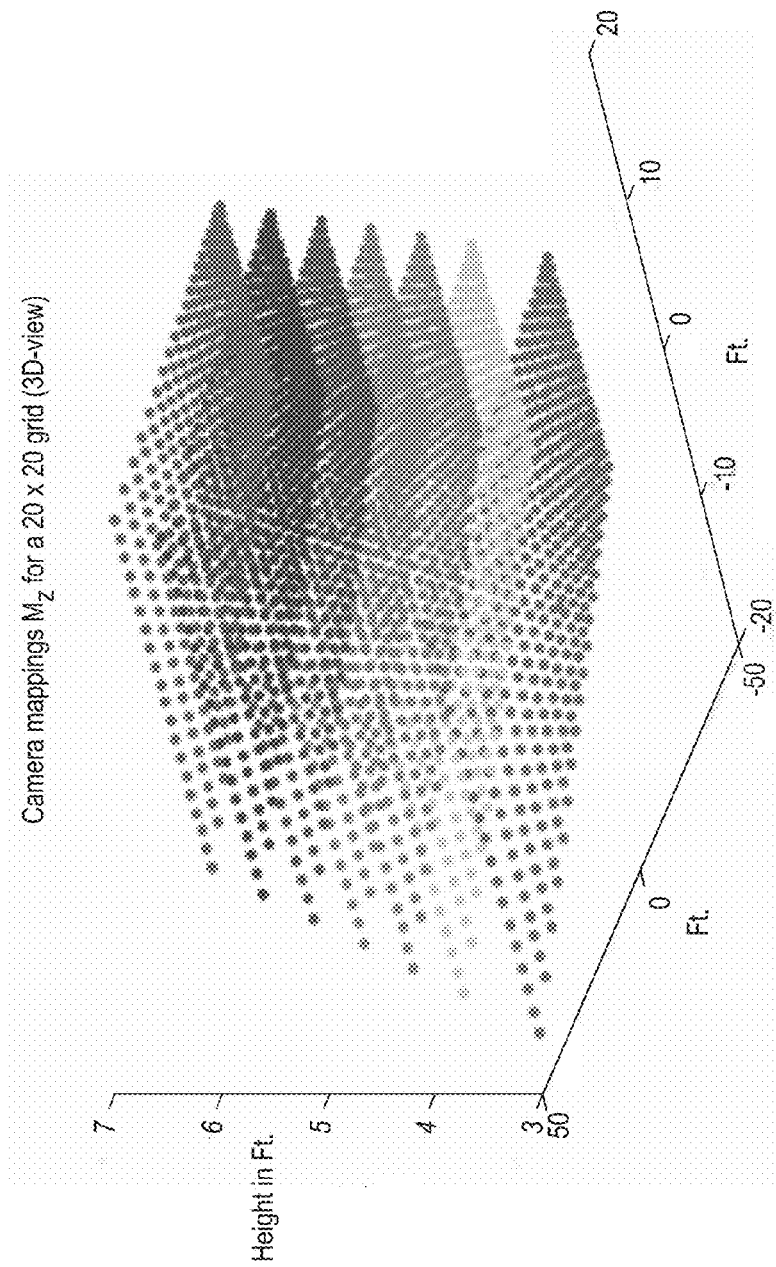
FIG. 9 illustrates a roadway with reference points of interest, in accordance with aspects of the embodiments.
Figure 10:
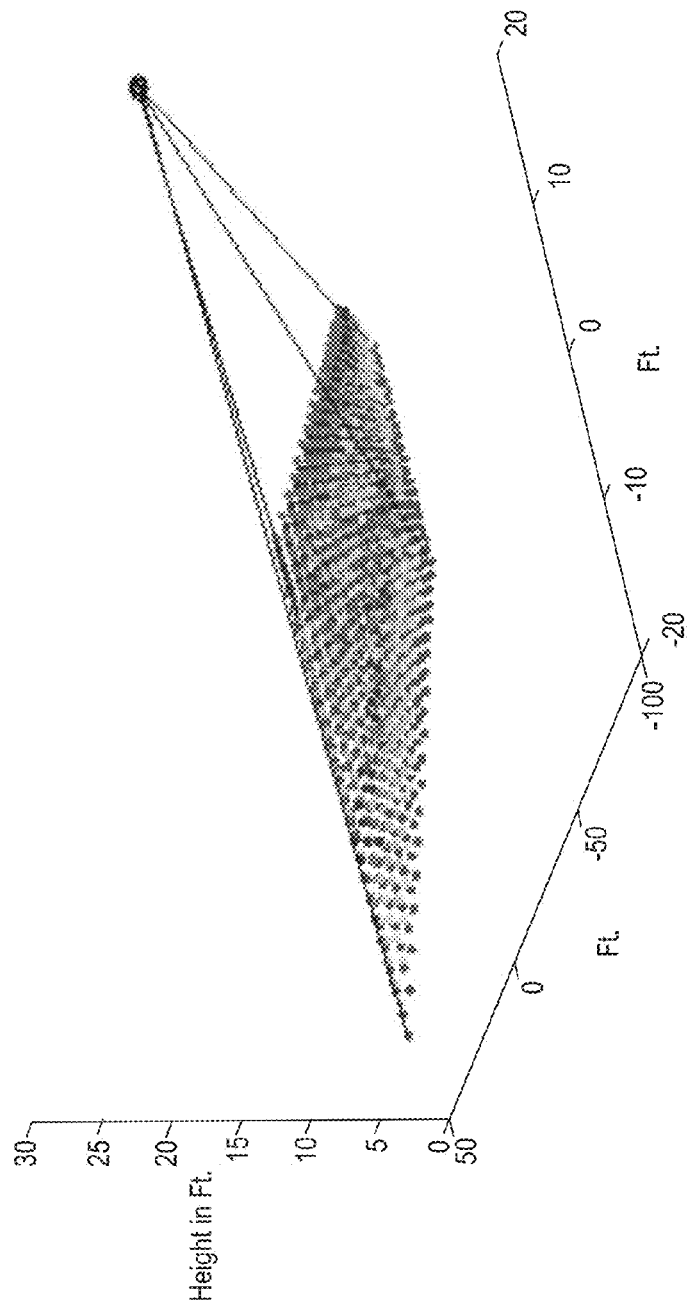
FIG. 10 illustrates a graphic depicting the camera field of view (FOV) in real-world coordinates for several values of height Z above a road surface.

Deriving an initial camera geometrical calibration 701 can occur offline. Offline means that the traffic analysis system is not currently analyzing traffic. An initial camera geometric calibration, $M_Z$:(i,j)→(X,Y), for Z=0, 1, 2, . . . (ft), can be derived using known methods such as that described in Wu. An example output is shown in FIGS. 8-10 which were produced in a test where the camera was mounted on a pole at 25 ft above the ground, about 3 ft off the side of the road, and aiming at the road about 90 ft away. The XYZ coordinates in FIGS. 8-10 use an arbitrary point on the ground as (0,0,0) and then use the height above the ground as Z-axis, road direction as Y-axis, and the direction orthogonal to the road as X-axis.

FIG. 10 illustrates a graphic depicting the camera field of view (FOV) in real-world coordinates in unit of ft for several values of height Z above the road surface. As shown in FIG. 10, extrapolating along Z reveals that the points converge at ~25 ft (in Z), which is the actual position of the camera in the test. The phenomena observed here are well-known in camera modeling. For example, as Z increases, the FOV should shrink and shift. As Z reaches the camera mounted height (~25 ft), the FOV should converge to a single point.

In another example embodiment, due to the property of camera projective distortion, the FOV in real-world applications (e.g., such as those in FIG. 8) is smaller for pixels closer to the camera (i.e., objects appear larger) and larger for pixels far away from the camera, This is the reason that the FOV has a quadrilateral shape with a wider top than bottom. For speed enforcement applications, it is sufficient to cover a height range of 2~5 feet for Z (as shown in FIG. 9) since this is the common mounting height of license plates, which are often the feature of choice for speed measurements. Additionally, from FIG. 9 or FIG. 10 it is clear that the mapping in Z is quite linear (unless significant lens optical distortion is present) since the linear extrapolation of the corners of the FOVs converges to a single point at about 25 ft, Thus, linear interpolation can be performed across Z without loss of accuracy. As a consequence of this observation, it is possible to update calibration mapping with reference scene marks from only one plane (e.g., ground plane) or relatively few height planes, which will be discussed below.

Identifying suitable reference points from a reference scene 702 can also occur offline. Suitable RPIs can be identified from the reference scene. Here the reference scene can be a frame or a series of frames of the scene after removing temporary landmarks (for Wu, this means the test vehicle with reference geometric targets has left the scene). A descriptor suitable for a RPI (i.e., the feature data used to describe the RPI, color histogram of the 25×25 image data centered at the RPI) should be distinct and robust against scaling and moderate geometric distortion so that it can be robustly detected and matched across frames even when the camera may have suffered some displacement (which is one reason for updating the calibration).

In addition, a RPI's height, Z, above the road plane should be either known or can be accurately determined from the initial camera geometric calibration. Note that each RPI can have a different length and type of feature data. For example, one RPI can use a color histogram of the 25×25 image data centered at the RPI, while another may use the color histogram of the 50×50 image data centered at the RPI or use the raw color intensities of a 25×25 image data centered at the RPI.

Scale invariant RPIs can be selected by utilizing algorithms such as, for example, SIFT or SURF. An example of a SIFT algorithm is taught in David G. Lowe, "Object recognition from local scale-invariant features," Proceedings of the International Conference on Computer Vision. 2. 1150-1157 (1999) (hereinafter "Lowe"). An example of a SURF algorithm is taught in Herbert Bay, Andreas Ess, Tinne Tuytelaars, Luc Van Cool "SURF: Speeded Up Robust Features," Computer Vision and Image Understanding (CVIU), 110(3), 346-359 (2008) (hereinafter "Bay"). Lowe and Bay are herein included by reference and in their entirety. Experimentally, SURF has yielded excellent results. RPI height can be constrained by limiting the reference points to be on the ground (Z=0) or on the top or bottom of a fixed vertical structure so that its Z can be readily estimated from initial camera geometric mappings $M_Z$.

Figure 11:
FIG. 11 illustrates a graphic depicting data indicative of the resulting RPIs from an implementation using SURF features on a frame of a test video acquired from a live test site.

For automated road plane estimation, one can use a method similar to the approach discussed in T. N. Schoepflin and D. J. Dailey, "Dynamic camera calibration of roadside traffic management cameras for vehicle speed estimation," IEEE Trans. on Intelligent Transportation Systems, 4(2), 90-98 (2003) (hereinafter "Schoepflin"). In order to identify a road surface, Schoepflin discloses monitoring motion in the traffic scene over a period of time and then the pixels with high activity are labeled as road (due to vehicles constantly travelling through), and/or one can use road boundary detection. One experimental implementation used an automated road plane detection method to select RPIs on the ground automatically but used a manual method (with a simple MATLAB GUI) for selecting RPIs on fixed vertical structures. FIG. 11 illustrates a graphic depicting data indicative of the resulting RPIs from an implementation using SURF features on a frame of a test video acquired from a live test site. The implementation details are discussed below.

An operation for computing reference real-world coordinates of the suitable reference points 703 from a reference scene 702 can also occur offline. Suitable RPIs can be identified from the reference scene. Once the initial camera geometric calibration mapping, $M_Z$, and the image coordinates and heights of the selected RPIs are determined, a reference data set that includes the image coordinates $(i^{(k)}, j^{(k)})$, the real-world coordinates $(X^{(k)}, Y^{(k)}, Z^{(k)})$, and the feature descriptors $D^{(k)}$ for each selected RPI k can be computed and stored for later use. Here, $D^{(k)}$ represnts feature descriptors of RPIs that are used for later matching of RPIs. Schoepflin also discloses details about SURF descriptors and matching. These computed real-world coordinates $(X^{(k)}, Y^{(k)}, Z^{(k)})$, and optionally the original image coordinates $(i^{(k)}, j^{(k)})$ of the matched RPIs from the current scene (discussed below), can be utilized to update the camera calibration to $M'_Z$.

Finding matched reference points in the current scene 704 can occur online. The term online means that the system is currently acquiring data and analyzing traffic. Here, matches of RPIs in the current scene are found. Depending on the method and features selected for identifying RPIs, different matching methods and criteria can be employed. For example, if Harris-corner is used for identifying RPIs, then one can use normalized cross-correlation on image patches (e.g. 25×25) centered at the RPIs for finding the best match. In the case of SURF, a standard matching algorithm based on its descriptors is available in MATLAB (e.g., see "MATLAB SURF feature matching", which is herein included by reference in its entirety). In any case, due to noise, some thresholding can be applied so that only those matches that exceed a predetermined confidence level are retained. The output of this step is a set of new image coordinates $(i'^{(k)}, j'^{(k)})$ of the matched RPIs. The new image coordinate may be the same as that of the corresponding matched RPI; when there is no change for all RPIs, there is no need to update the calibration, so the amount of change in image coordinates can be used to determine when an update to the calibration needs to be applied.

Updating the camera geometric calibration 705 can also occur online. Camera geometric calibration can be updated based on the resulting image coordinates of the matched RPIs in the current frame or several preceding frames.

In one exemplary embodiment, a complete refresh of the camera geometric calibration mapping establishes $M'_Z$. That is, the camera geometric calibration mapping can be rebuilt based on the new image coordinates $(i'^{(k')}, j'^{(k')})$ and the corresponding reference real-world coordinates $(X^{(k')}, Y^{(k')}, Z^{(k')})$ of the matched k' RPIs. Note that the reference (old) image coordinates $(i^{(k')}, j^{(k')})$ are not used at all, thus the term "refresh". This requires the number of matched RPIs to be large, and to cover various height levels above the ground plane (i.e., various values of Z) in order for the refresh to be robust to noise. Since for a typical traffic scene there may be many RPIs at Z=0 but very few other Z values from the static scene, a good strategy may be to refresh $M'_{Z=0}$ using all the matched points with Z=0, while updating other $M'_Z$, Z=1 based on the same linear relationship to $M'_{Z=0}$ from initial models $M_Z$, Z=1, 2, ... to $M_Z=0$.

Another exemplary embodiment can employ a weighted adjustment (refinement) of camera geometric calibration mapping from previous $M'_Z$. That is, small adjustments are made to the initial camera geometric calibration mapping $M_Z$ to get a new $M'_Z$ every time a new measurement (i.e., a new set of image coordinates from matched RPIs in the current frame) is obtained. A common approach for such adjustment is to use (Extended) Kalman Filter. Since this approach aligns with the concept of control theory, many known noise-rejection control algorithms can be applied here. The advantages of this method over the refresh method are: (1) it can update the model even if only one matched RPI is found; (2) it can be tuned to be robust to matching noises, e.g., using lower control gain, though this may suffer from slow update; and (3) many known control algorithms are readily available. However, if the measurement noise is very low and the number of matching points is large, complete refresh may be the best solution in terms of accuracy and computational efficiency.

Yet another exemplary embodiment using a hybrid approach that combines refresh and refinement over the time scale can also be used, based on number of detected reference points and computed rate of change of calibration parameters.

A temporal aspect of the above embodiments has not yet been discussed explicitly. The most common and straightforward approach is to apply the above method in isolation for each selected frame, which may be, e.g., once every N frames, or whenever a frame has more than 5 matches, or the frame that has most matching RPIs among the N frames, etc. A better solution is to track all the matched RPIs over a predetermined time period and use the temporally filtered (e.g., smoothing or median filtering to remove outliers) smooth trajectory data for updating the calibration mapping, rather than using the non-smoothed data directly. It is also possible to provide for an on-off type of update, wherein the update is applied only when a significant amount of change in the resulting new image coordinates of the matched RPIs is detected. Other types of temporal treatment can also be used along with the above mentioned update methods.

Assessing calibration changes 706, which can be optional, can also occur online. Here, the amount of calibration changes (more precisely, the amount of change in the field of view) can be assessed and monitored for the purpose of update, diagnostics, and maintenance. A simple approach is to use the average of the absolute image coordinate changes, i.e.

$$\frac{1}{n'}\sum_{k'}(|i'^{(k')}-i^{(k')}|+|j'^{(k')}-j^{(k')}|),$$

as a measure of calibration changes. Other statistical measures on the difference, such as mean square error (MSE), median, etc., can be used as well.

Another option is to assess the difference in terms of displacement in real-world coordinates, i.e., mapping both $(i^{(k')}, j^{(k')})$ and $(i'^{(k')}, j'^{(k')})$ to real-world coordinates using initial camera calibration mapping $M_Z$, and then calculating average absolute difference (or MSE or other statistics) in real-world coordinates. It is assumed that the reference marker does not move, but the camera can move. In such a case, this assessment is a measurement of the real-world dimensional errors due to uncompensated camera movement. Another improvement of this assessment is to pre-select a set of points in image coordinates (e.g., a grid spaced at every 100 pixels in i & j directions) and calculate the real-world coordinate differences between using $M_Z$ and using $M'_Z$. Once the assessment is available, it can be used to determine whether to apply the update (e.g., if the difference is small, one may decide not to update), or for diagnostics and maintenance (a service call may be necessary if the camera has moved too much).

Some details from the planned implementation of certain aspects of an exemplary and non-limiting embodiment are discussed here for clarification purposes.

In an example embodiment, a short clip of the video (~20 sec) of the test site can be analyzed to identify road surface from those frames that are nearly static. This can be achieved by a simple background subtraction method, where the background is learned on-line using, for example, the formula: $I_{bg}=0.95I_{bg}+0.05I_{current}$. In one example, the first N=99 frames may be used only for learning background. After N frames, for each frame the cumulative activity map (i.e., same size as I) of each pixel is increased by 1 whenever the intensity value of the current frame differs from current background frame by more than, for example, $\eta_1=5$ units (i.e., in 0~255 scale). The total activity of this frame (i.e., the number of pixels that are active) can be also calculated and utilized later in the identification of near-static frames. Since only one or a few such nearly static frames need to be identified for each test site, a very high probability exists of finding them.

Once at least one static or nearly static frame is found, standard SURF detection can be applied to find, for example, the top M=100 interesting points on this frame. Optionally, standard SURF detection can be applied to two such static frames (ideally spaced out in time rather than consecutive) and RANSAC utilized to pick top M=100 RPIs that are robust in both detection and matching between the two frames under projection mapping model. RANSAC is an acronym for "RANdom SAmple Consensus", which is an iterative method that can be employed to estimate parameters of a mathematical model from a set of observed data which contains outliers. RANSAC is a non-deterministic algorithm in the sense that it produces a reasonable result only with a certain probability, with this probability increasing as more iterations are allowed.

In certain embodiments, only those RPIs that are confidently labeled as road plane are kept. This can form the RPI set. Here "confidently labeled" is determined by computing the fraction of pixels within a window centered at the location of each candidate RPI that are classified as road pixels and comparing it to a pre-determined threshold. This activity can occur before or after that of finding static frames.

If a manual step is provided for, then a simple GUI can be provided that allows an operator to draw the road boundary, edit or remove candidate RPIs, etc. Furthermore, manual selection would enable selection of points on a fixed vertical structure but not on the road plane. These points at $Z\neq 0$ can be utilized to refine the linear relationship between $M_Z$ and $M_0$. Since this step or operation is needed only at the set up and would occur very infrequently, it may be worthwhile to have such an option included in the system.

It will be appreciated that various of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for updating camera geometric calibration utilizing scene analysis, said method comprising:
   receiving initial camera geometric calibration parameters with respect to at least one camera;
   discovering reference points of interest from an initial reference frame in a scene acquired by said at least one camera;
   applying said camera geometric calibration parameters to image coordinates of said discovered reference points of interest to provide real-world coordinates of said discovered reference points of interest;
   analyzing a subset of a video stream from said at least one camera to identify feature points of a current scene captured by said at least one camera that match said discovered reference points of interest; and
   providing a current update of said camera geometric calibration parameters with respect to said current scene.

2. The method of claim 1 further comprising measuring changes between said current scene and said scene acquired for deriving initial camera calibration of said at least one camera, utilizing at least one of:
   a difference between image pixel coordinates of said identified feature points of a current scene and image pixel coordinates of said discovered reference points of interest;
   a difference between real-world coordinates of said identified feature points of a current scene and real-world coordinates of said discovered reference points of interest; and
   a difference between the camera calibration parameters derived from the image pixel coordinates and real-world coordinates of identified feature points of a current scene, and said initial camera calibration parameters,
   to generate assessment data for triggering at least one of recalibration, maintenance, and diagnostics of said at least one camera.

3. The method of claim 2 wherein said real-world coordinates are determined by application of said initial camera geometric calibration parameters to said image pixel coordinates.

4. The method of claim 1 further comprising storing said image pixel coordinates and said real-world coordinates of said discovered reference points for future online calibration updates of said at least one camera.

5. The method of claim 1 further comprising:
   identifying said feature points of a current scene captured by said at least one camera, which match said discovered reference points of interest, utilizing at least one of the following techniques: SIFT matching, SURF matching, cross-correlation matching, or matching objects of interest.

6. The method of claim 1 wherein said discovered reference points of interest are discovered utilizing at least one of the following detection techniques: SIFT, SURF, Harris corner, Shi-Tomasi corner, object of interest detection, RANSAC, and manual specification using a graphical user interface.

7. The method of claim 1 wherein said providing a current update of said camera geometric calibration parameters is performed utilizing at least one of the following updating techniques: a rebuild of camera calibration based on the image pixel coordinates of said identified feature points identified by analyzing one or more current frames and the real-world coordinates of said discovered reference points stored in said database; a weighted combination of the initial camera calibration and said rebuilt camera calibration; and a modification of initial camera calibration using extended Kalman filtering techniques using the observed image pixel coordinates of said identified feature points identified by analyzing one or more current frames.

8. The method of claim 6 wherein said discovered reference points are selected such that said discovered reference points lie on the plane of the road.

9. A system for updating camera geometric calibration utilizing scene analysis, said system comprising:
   at least one processor; and
   a computer-usable medium embodying computer program code, said computer-usable medium capable of communicating with said at least one processor, said computer program code comprising instructions executable by said at least one processor and configured for:
   receiving camera geometric calibration parameters with respect to at least one camera;
   discovering reference points of interest from a scene acquired by said at least one camera;
   applying said camera geometric calibration parameters to image coordinates of said discovered reference points of interest to provide real-world coordinates of said discovered reference points of interest;
   analyzing a subset of a video stream from said at least one camera to identify feature points of a current scene captured by said at least one camera that match said discovered reference points of interest; and
   providing a current update of said camera geometric calibration parameters with respect to said current scene.

10. The system of claim 9 wherein said instructions are further configured for measuring changes between said current scene and said scene acquired for deriving initial camera calibration of said at least one camera, utilizing at least one of:
    a difference between image pixel coordinates of said identified feature points of a current scene and image pixel coordinates of said discovered reference points of interest;
    a difference between real-world coordinates of said identified feature points of a current scene and real-world coordinates of said discovered reference points of interest; and
    a difference between the camera calibration parameters derived from the image pixel coordinates and real-world coordinates of identified feature points of a current scene and said initial camera calibration parameters, to generate assessment data for triggering at least one of recalibration, maintenance, and diagnostics of said at least one camera.

11. The system of claim 9 wherein said real-world coordinates are determined by application of said initial camera geometric calibration to image pixel coordinates.

12. The system of claim 9 wherein said instructions are further configured for storing said image pixel coordinates and said real-world coordinates of said discovered reference points for future online calibration updates of said at least one camera.

13. The system of claim 9 wherein said instructions for identifying said feature points of a current scene further comprise instructions configured for:
identifying feature points of a current scene captured by said at least one camera that match said discovered reference points of interest utilizing at least one of the following techniques: SIFT matching, SURF matching, cross-correlation matching, or matching objects of interest.

14. The system of claim 9 wherein said instructions are further configured for discovering said discovered reference points of interest utilizing at least one of the following detection techniques: SIFT, SURF, Harris corner, Shi-Tomasi corner, object of interest detection, RANSAC, and manual specification using a graphical user interface.

15. The system of claim 9 wherein said instructions configured for providing a current update of said camera geometric calibration parameters are performed utilizing at least one of the following updating techniques: a rebuild of camera calibration based on the image pixel coordinates of said identified feature points identified by analyzing one or more current frames and the real-world coordinates of said discovered reference points stored in said database; a weighted combination of the initial camera calibration and said rebuilt camera calibration; and a modification of initial camera calibration using extended Kalman filtering techniques using the observed image pixel coordinates of said identified feature points identified by analyzing one or more current frames.

16. A traffic analysis and monitoring system, said system comprising:
a traffic camera, wherein a geometric calibration function relates image pixel coordinates of said traffic camera to real-world coordinates;
a database that stores a reference data set composed of real-world coordinates of discovered reference points present in a field of view of said traffic camera;
a feature point identification module that communicates with said database and which identifies image pixel coordinates of feature points of a new frame that match said discovered reference points, as imaged by said traffic camera;
a calibration testing module that communicates with said feature point identification module and said database and which calculates at least one of:
a difference between image pixel coordinates of said feature points in the new frame, identified by said feature point identification module, and image pixel coordinates of said discovered reference points stored in said database; and
a difference between real-world coordinates of said discovered reference points taken from said reference data set and real-world coordinates of corresponding said feature points in the new frame calculated from said geometric calibration function applied to image pixel coordinates of said feature points in the new frame, determined by said feature point identification module; and
a calibration updating module that communicates with said calibration testing module, said feature point identification module and said database, and which updates said geometric calibration function if said difference calculated by said calibration testing module is greater than a predefined threshold.

17. The system of claim 16 wherein said feature point identification module identifies data based on said new frame utilizing at least one of the following techniques: SIFT matching, SURF matching, cross-correlation matching, or matching objects of interest.

18. The system of claim 16 wherein said discovered reference points are discovered utilizing at least one of the following detection techniques: SIFT, SURF, Harris corner, Shi-Tomasi corner, object of interest detection, RANSAC, and manual specification using a graphical user interface.

19. The system of claim 16 wherein said updating said geometric calibration function is performed utilizing at least one of the following updating techniques: a rebuild of camera calibration based on the image pixel coordinates of said feature points identified by said feature point identification module on one or more current frames and the real-world coordinates of said discovered reference points stored in said database; a weighted combination of the initial camera calibration and the rebuilt camera calibration; and a modification of initial camera calibration using extended Kalman filtering techniques using the observed image pixel coordinates of said feature points identified by said feature point identification module on one or more current frames.

20. The system of claim 18 wherein said discovered reference points are selected such that said discovered reference points lie on the plane of the road.

* * * * *